United States Patent
Peters et al.

(10) Patent No.: US 6,539,496 B1
(45) Date of Patent: Mar. 25, 2003

(54) METHOD FOR PREVENTING REPEATING NON-RECOVERABLE READ ERRORS AT SAME PHYSICAL LOCATION ON DATA STORAGE MEDIA

(75) Inventors: Eric Ryon Peters, Roy, UT (US); Daniel D. Rochat, Ogden, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/425,680

(22) Filed: Oct. 22, 1999

(51) Int. Cl.$^7$ ................................................ H04B 1/74
(52) U.S. Cl. ............................ 714/8; 714/16; 714/54
(58) Field of Search .............................. 714/8, 16, 17, 714/42, 54; 369/53.14

(56) References Cited

U.S. PATENT DOCUMENTS

| | | | |
|---|---|---|---|
| 5,623,470 A | 4/1997 | Asthana et al. | 369/58 |
| 5,682,272 A | 10/1997 | Taroda et al. | 360/53 |
| 5,768,494 A * | 6/1998 | Takeishi | 714/16 |
| 5,848,438 A | 12/1998 | Nemazie et al. | 711/201 |
| 6,145,051 A * | 11/2000 | Estakhri et al. | 711/103 |
| 6,327,674 B1 * | 12/2001 | Ito et al. | 711/203 |

FOREIGN PATENT DOCUMENTS

EP        0 795 813 A2    9/1997

* cited by examiner

*Primary Examiner*—Scott Baderman
*Assistant Examiner*—Joshua Lohn
(74) *Attorney, Agent, or Firm*—Woodcock Washburn LLP

(57) ABSTRACT

Methods are provided for preventing data from being written to a data sector that has been identified as faulty on a disk in a disk drive system. It is first determined whether data of a data sector of a portion of a disk is recoverable. If the data is non-recoverable, an invalid logical ID is written to the logical block address (LBA) corresponding to the data sector thereby identifying the data sector as faulty and preventing data from being written at the data sector. The LBA is then reallocated to point to a different data sector if the data is non-recoverable. Thus, further data directed to the LBA will be written to the different data sector responsive to the reallocated LBA, thereby avoiding writing the new data to the data sector identified as faulty. Internal drive read re-tries can still take place on the faulty data sector even after the LBA has been assigned an invalid logical ID.

12 Claims, 3 Drawing Sheets

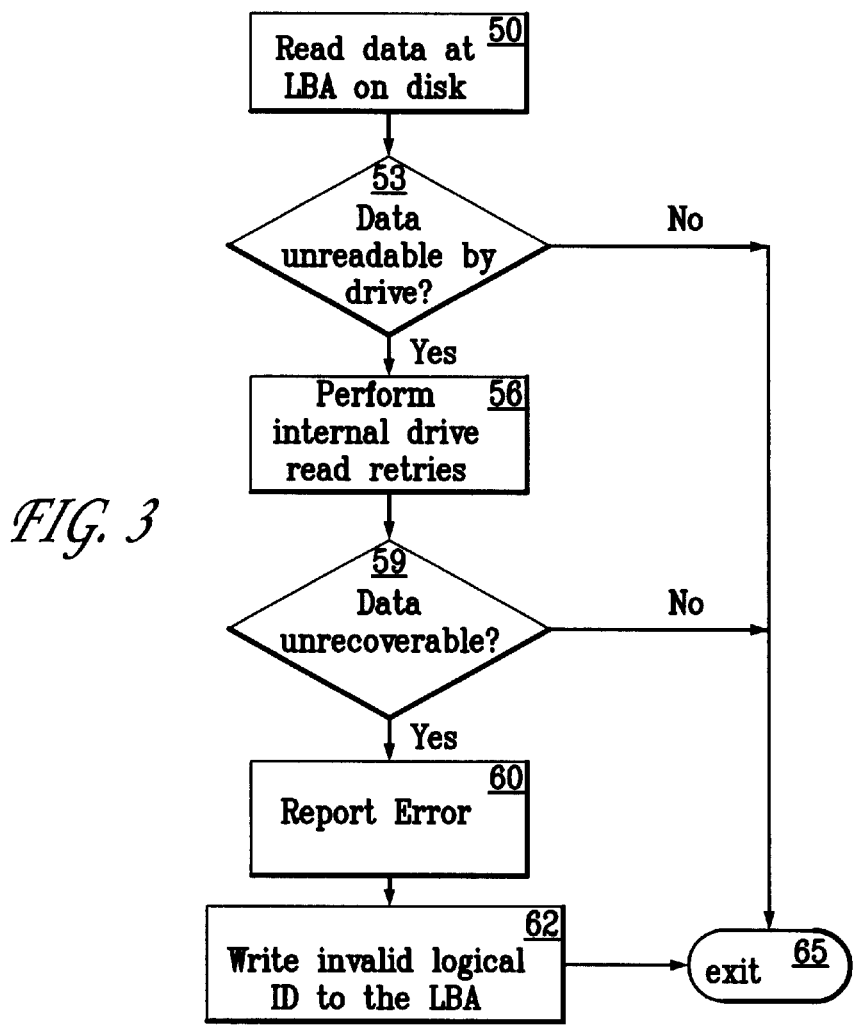
FIG. 3
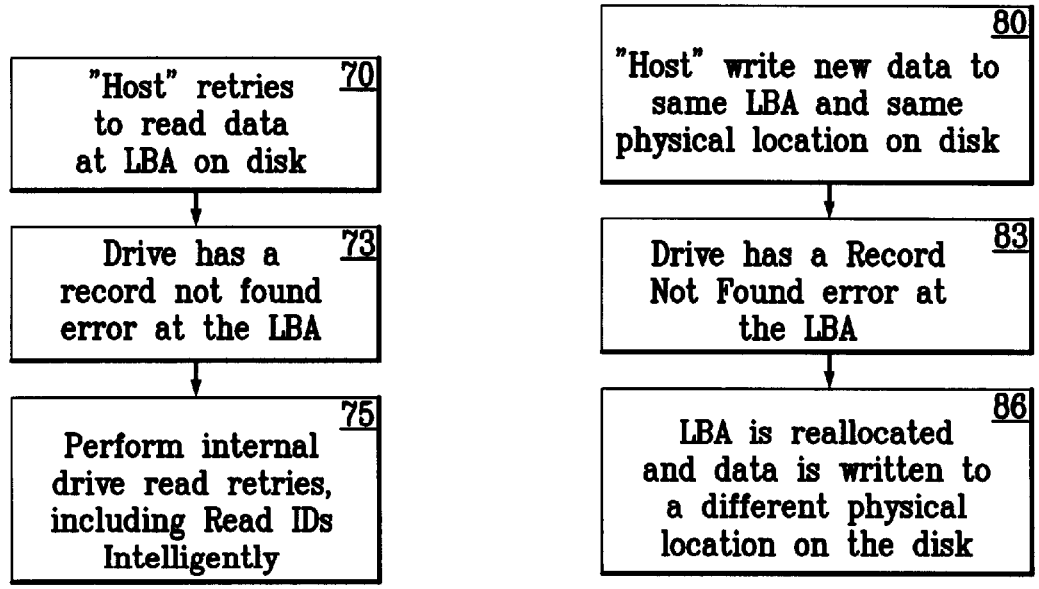
FIG. 4
FIG. 5

METHOD FOR PREVENTING REPEATING NON-RECOVERABLE READ ERRORS AT SAME PHYSICAL LOCATION ON DATA STORAGE MEDIA

FIELD OF THE INVENTION

This invention relates generally to storage subsystems for computer systems. In particular, this invention relates to methods for preventing data from being written to the same physical location on a storage medium that a non-recoverable read error occurred previously.

BACKGROUND OF THE INVENTION

Maximizing the reliability of the data in disk drives is a key objective of disk drive designers. If an error occurs during a read operation, the offending section of data can be re-read or re-written to. It is realized that permanent disk damages could occur and the data will still be bad even after further re-write processes. It then becomes desirable to flag the physical area on the disk as bad and use the available spare sectors (a process called reallocation). Reallocation is used to move the data on the bad sector to another sector. If the data on the bad sector is not recovered, reallocation does not occur. Moreover, the prior art does not permanently prevent later re-use of the previously flagged bad physical location on the disk. Accordingly, there is a possibility of a non-recoverable read error of newly written data occurring at the same physical location that a non-recoverable read error of old data occurred previously.

Thus, there is a need for a system and method to detect non-recoverable read errors on a magnetic disk and to prevent future writing to the bad sectors, thereby eliminating the possibility that a non-recoverable read error will occur in the same physical location that a non-recoverable read error occurred previously.

SUMMARY OF THE INVENTION

The present invention is directed to a method for preventing data from being written to a data sector that has been identified as faulty on a disk in a disk drive system. It is first determined whether data of a data sector of a portion of a disk is recoverable. If the data is non-recoverable, an invalid logical ID is written to the logical block address (LBA) corresponding to the data sector thereby identifying the data sector as faulty and preventing data from being written at the data sector. If new data is written, the LBA is then reallocated to point to a different data sector if the data is non-recoverable. Thus, further data directed to the LBA will be written to the different data sector responsive to the reallocated LBA, thereby avoiding writing the new data to the data sector identified as faulty. Internal drive read re-tries can still take place on the faulty data sector even after the LBA has been assigned an invalid logical ID.

According to aspects of the invention, the data of the data sector is determined to be recoverable or not by reading the data sector responsive to at least one of a host ordered read and an internal drive read re-try.

Preferably, a predetermined number of internal drive re-tries occurs if a host ordered read is unsuccessful.

According to another aspect of the invention, an error condition is generated if the data is non-recoverable.

Another exemplary method of preventing writing data to a faulty data sector comprises receiving a request to write data to an LBA; determining if the LBA corresponds to a faulty data sector; reallocating the LBA to a new data sector if the LBA corresponds to the faulty data sector; and writing the data to the new data sector responsive to the reallocation.

According to aspects of the invention, determining if the LBA corresponds to a faulty data sector comprises checking the LBA for an invalid logical ID.

An exemplary method of reading data on a disk in accordance with the present invention comprises receiving a read request for an LBA; determining if an invalid logical ID corresponds to the LBA; and generating a record not found condition if the read request is a user request or a host level request, and the invalid logical ID corresponds to the LBA.

According to aspects of the invention, the method further comprises attempting to read the data if at least one of the read request is an internal drive Read ID Intelligently re-try and the LBA contains a valid logical ID.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 3 is a flowchart representing an exemplary method of flagging a bad or faulty data sector in accordance with the present invention;

FIG. 4 is a flowchart representing an exemplary method of reading a flagged data sector in accordance with the present invention; and FIG. 5 is a flowchart representing an exemplary method of reallocating data in accordance with the present invention.

DETAILED DESCRIPTION OF THE INVENTION

The present invention prevents the possibility of a writing data to the same physical location on a data storage medium that a non-recoverable read error occurred previously. After data written in a data sector is determined to be non-recoverable, an invalid logical ID is written to the logical block address (LBA) to guarantee that future writes are reallocated to a different physical location on the disk. Until an invalid logical ID is written to the LBA representing the non-recoverable data, the present invention allows for host level read re-tries to attempt to recover the original recorded data. After an invalid logical ID is written to the LBA, the non-recoverable data sector can still be read by internal drive re-tries. The present invention is preferably implemented in firmware of the disk drive.

Figure 1:
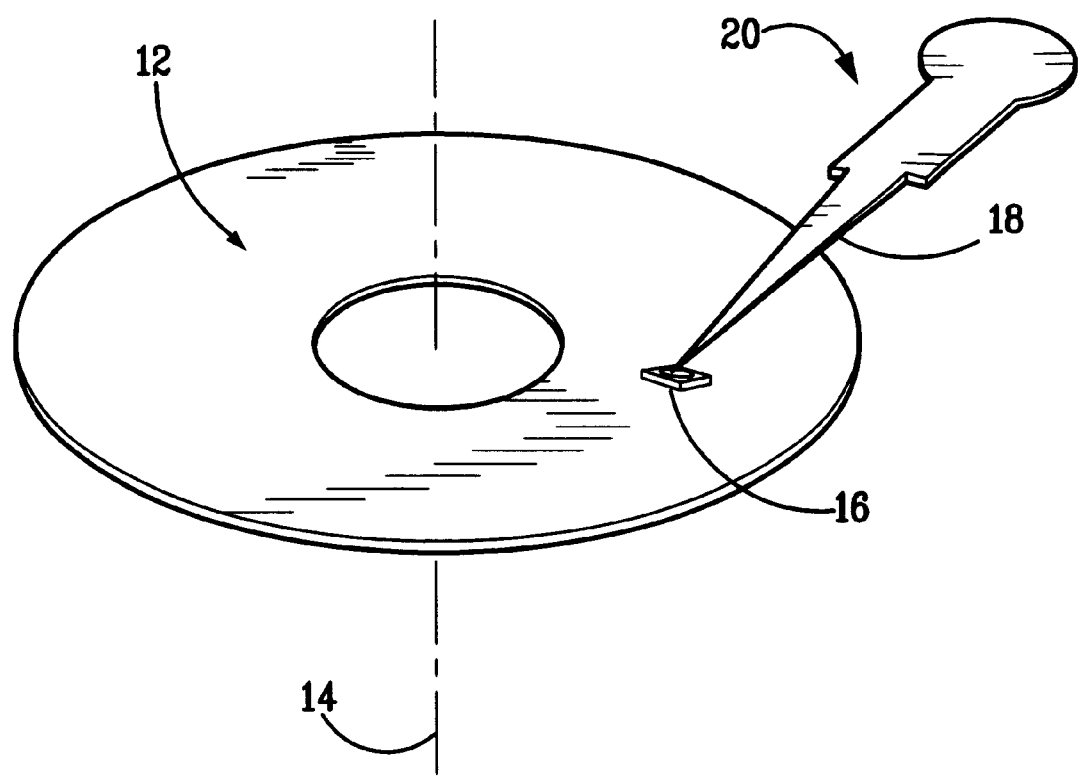
FIG. 1 is a diagram depicting an exemplary disk and arm assembly wherein the method of the present invention may be employed.

FIG. 1 is a representation of a disk drive mechanism wherein the operation of the present invention may be illustrated. As shown, a disk 12 rotates about a spindle motor axis 14. The surface of the disk 12 is receptive to electromagnetic signals for storing data. Read/write electronics, embedded within slider bearing 16 generates an electromagnetic signal to write data and read an electromagnetic signal from the disk surface to read data. The slider bearing 16 with embedded read/write electronics is also referred to herein as a read/write head 16. The read/write head 16 is attached to arm 18. The head 16 and arm 18 assembly are attached to suspension 20. To access selected data sections, the arm 18 with attached read/write head 16 moves over the surface of disk 12 both reading and writing data as required. Spring tension (not shown) urges the arm 18 and read/write head 16 against the surface of the disk 12. When the spindle motor (shown as spindle axis line 14) spins the disk 12 at full speed, air pressure develops between the read/write head 16 and the surface of disk 12 and lifts the read/write head 16 off of the surface of the disk 12.

Before data can be read or written to disk 12, that disk must be formatted. The format divides the surface of the disk 12 into tracks and subdivides those tracks into sectors. The surface of disk 12 is divided into tracks by pre-recording servo marks along each track. For example, there may sixty or more servo marks per track, i.e., a servo mark every six degrees. The read/write head 16 uses these servo marks during operation of the disk drive to locate tracks. Thereafter, the read/write head 16 can lock onto tracks by following the servo marks. During an additional format process, which may be separate from track formatting, the track is subdivided into sectors.

Figure 2:
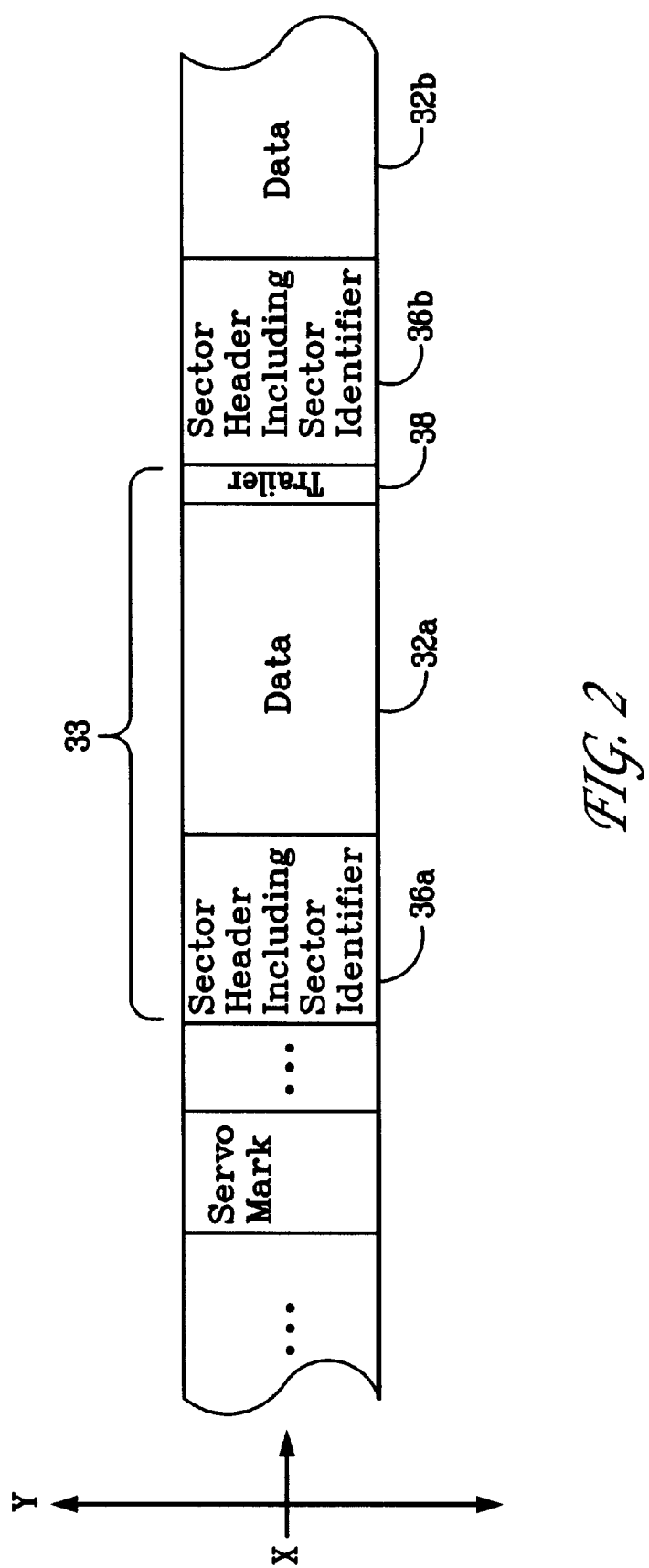
FIG. 2 is a graphical representation of an exemplary signal of a portion of data from the disk.

As shown in FIG. 2, each sector 33 is demarcated along the track with a header 36 and a trailer 38 that is recorded onto the disk surface. The header contains overhead information, such as constant density recording ("cdr" field (indicating how many bytes to the next servo field), track id field (identifying all sectors on the same logical track), sector id field (identifying a particular sector) and id error correction code field (containing an error correction code for cdr, track id and sector id fields). Data is stored in data sections 32*a*, 32*b*. The number of sectors per track may vary, e.g., the innermost track may have 90 sectors per track, while the outermost track has 150 sectors per track. However, the number of servo fields remains the same for each track. For example, servo marks may appear every 3 degrees around each track. Servo marks contain a grey code (containing the physical track number), and norm and quad fields (indicating the head distance from the track center).

After the disk 12 has been properly formatted, it is ready for use, such that data may be read from and written to its surface in data sections within each sector (e.g., data sections 32*a*, 32*b*). While the read/write head 16 is reading and writing data to the disk 12, the arm 18 must follow the tracks that were written to the surface of the disk 12 during formatting. The arm 18 via the head 16 thus reads the servo marks to ensure that the tracks are closely followed during operation.

Significantly, during a write operation, the head 16 continues to read the servo marks to ensure proper track following and to read the sector identifiers to find the proper location for data. Additionally, during the write operation, the head continues to read every grey code, servo mark, id mark, cdr field and track id. The signal read back will translate to a specific predetermined value. If any of the values do not match the predetermined value, an error condition results. Also, certain values are checked against the error correction code field. If a mismatch occurs, then an attempt is made to correct the data using the error correction code field. Data can be unreadable and unrecoverable for many reasons, such as poor signal strength in the data sections 32*a*, 32*b*, or physical damage to the disk.

Referring now to FIGS. 3–5, exemplary methods of flagging a bad or faulty sector, reading the bad sector, and reallocating data on a disk in accordance with the present invention will be described in detail. The reading and flagging process begins at step 50 with a user or the host operating system, for example, initiating a request to read particular data at a logical block address (LBA) on the disk. An LBA is a value that maps to a specific cylinder-head-sector address on the disk. It is determined at step 53 if the data at the LBA is readable; i.e., if the data can be read without error. If the data is readable, then the data is read, the operation is complete, and processing continues with the routine exiting at step 65. However, if the data is unreadable at step 53, a predetermined number of internal drive re-tries are executed at step 56 on the faulty sector in an attempt to read the data. If the data is readable, then the data is read, the operation is complete, and processing continues with the routine exiting at step 65. If the data is still unreadable after the internal drive re-tries, it is then determined at step 59 that the data is non-recoverable and the sector is bad or faulty. After the data is determined to be non-recoverable after the internal drive re-tries, an error is reported at step 60, and the drive writes an invalid logical ID to the LBA at step 62, and the routine exits at step 65. The invalid logical ID prevents user or host re-tries of reading the data as well as writing data to that particular address, as described below.

At this point, with reference to FIG. 4, at step 70, if user or host re-tries are attempted in order to read the data at the LBA that contains the non-recoverable data, the drive will return a 'record not found' error at the LBA at step 73. The record not found error results from the invalid logical ID that was written at step 62. Internal drive re-tries, including 'Read ID's Intelligently' are then performed at step 75. These internal drive re-tries may be able recover the data at the bad sector at any time, even after the invalid logical ID is written to the LBA (or after the subsequent LBA reallocation described below). Thus, the non-recoverable data remains in the sector, and the sector can still be read by the internal drive re-tries in an attempt to recover the data.

Referring to FIG. 5, when new data is ordered to be written to the same LBA that had previously contained the non-recoverable data, the host attempts to write new data to the same LBA and same physical location on the disk, at step 80. The drive receives a 'record not found' error at the LBA, at step 83, as a result of the invalid logical ID that was written to the LBA at step 62. At this point, the LBA is reallocated and the data is written to a different physical location on the disk, at step 86. Note that the reallocation removes the invalid logical ID from the LBA and replaces it with a new address for a different data sector. Thus, the host, during subsequent reads, will read the new data at the same LBA, which, however, points to a different location on the disk in which it is likely that the data is readable/recoverable. Thus, if a write is attempted to a bad sector, it will get reallocated to a different, more preferable location. In this manner, data is prevented from being written to the same physical location on a storage medium that a non-recoverable read error occurred previously. It should be noted that the bad sector can still be read.

Another exemplary embodiment in accordance with the present invention uses extra bits in the reallocation table entries. When the drive fails to recover the data of a sector that the host has requested, a special entry is made to the reallocation table. This reallocation entry has a flag that indicates reads should be attempted from the old physical location and writes should be attempted to the new physical location. Following a write command, the flag is cleared so subsequent reads are from the new location. This method allows a write attempt to be performed to the old location where the integrity of the write could be verified with a verify pass. If the write is successful, the reallocation table entry could be cleared, saving a table entry. The flag can be an unused bit in the track field of the reallocation table entry. This would cause older drives to ignore the entry because the track would not match.

Advantages of this embodiment include: (1) no ID's have to be written; and (2) a write with verify to the old sector may show that the sector is good, thus saving a reallocation entry.

Variations on the above embodiment can include: (1) if the write to the old location is successful, leave the entry in the reallocation table so that future writes would also be verified; and (2) if the space is needed for a legitimate reallocation, then delete reallocations with the flag set.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method of preventing data from being written to a data sector that has been identified as faulty on a disk in a disk drive system, comprising:
    determining whether data of a data sector of a portion of a disk is recoverable; and
    if the data is non-recoverable, writing an invalid logical ID to the logical block address (LBA) corresponding to the data sector thereby identifying the data sector as faulty and preventing data from being written at the data sector and allowing data to subsequently be read from the data sector at any time.

2. The method according to claim 1, wherein determining whether the data of data sector is recoverable comprises reading the data sector responsive to at least one of a host ordered read and an internal drive read re-try.

3. The method according to claim 2, wherein determining whether the data of the data sector is recoverable comprises reading the data sector responsive to a host ordered read, and performing a predetermined number of internal drive re-tries if the host ordered read is unsuccessful.

4. The method according to claim 1, further comprising generating an error condition if the data is non-recoverable.

5. The method according to claim 4, wherein generating the error condition comprises reporting an error condition.

6. The method according to claim 1, further comprising performing internal drive Read ID's Intelligently re-tries on the data sector after it has been determined to be faulty.

7. The method according to claim 1, further comprising reallocating the LBA to point to a different data sector if the data is non-recoverable.

8. The method according to claim 7, further comprising writing new data to the different data sector responsive to the reallocated LBA, thereby avoiding writing the new data to the data sector identified as faulty.

9. The method according to claim 7, wherein the reallocating is initiated responsive to receiving new data to be written to the faulty data sector corresponding to the LBA.

10. A method of preventing writing data to a faulty data sector, comprising:
    receiving a request to write data to an LBA;
    determining if the LBA corresponds to a faulty data sector by checking the LBA for an invalid logical ID;
    reallocating the LBA to a new data sector if the LBA corresponds to the faulty data sector; and
    writing the data to the new data sector responsive to the reallocating, and allowing data to subsequently be read from the faulty data sector at any time.

11. A method of reading data on a disk, comprising:
    receiving a read request for an LBA;
    determining if an invalid logical ID corresponds to the LBA; and
    generating a record not found condition if the read request is one of a user request and a host level request, and the invalid logical ID corresponds to the LBA.

12. The method according to claim 11, further comprising attempting to read the data if at least one of the read request is an internal drive Read ID Intelligently re-try and the LBA contains a valid logical ID.

* * * * *

UNITED STATES PATENT AND TRADEMARK OFFICE
CERTIFICATE OF CORRECTION

PATENT NO.     : 6,539,496 B1
DATED          : March 25, 2003
INVENTOR(S)    : Eric Ryon Peters and Daniel D. Rochat It is certified that error appears in the above-identified patent and that said Letters Patent is hereby corrected as shown below:

Column 3,
Line 27, delete " ("cdr" " and insert -- ("cdr") -- therefor;

Column 6,
Line 31, delete "and";
Line 33, delete "reallocating," and insert -- reallocating; -- therefor.

Signed and Sealed this

Twenty-ninth Day of July, 2003

JAMES E. ROGAN
*Director of the United States Patent and Trademark Office*